(12) United States Patent
Sato

(10) Patent No.: US 7,561,226 B2
(45) Date of Patent: Jul. 14, 2009

(54) LIQUID CRYSTAL DISPLAY WITH IMPROVED DISPLAY UNEVENNESS

(75) Inventor: Hiroki Sato, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 246 days.

(21) Appl. No.: 11/605,545

(22) Filed: Nov. 29, 2006

(65) Prior Publication Data

US 2007/0121030 A1    May 31, 2007

(30) Foreign Application Priority Data

Nov. 30, 2005   (JP)   ............... 2005-346523

(51) Int. Cl.
*G02F 1/1335*   (2006.01)
(52) U.S. Cl. .............. 349/64; 349/42; 349/61; 349/62; 349/65; 349/96; 349/106; 349/117
(58) Field of Classification Search ............ 349/42, 349/61–62, 64–65, 96, 106, 117
See application file for complete search history.

(56) References Cited

U.S. PATENT DOCUMENTS

| 6,788,359 B2 | 9/2004 | Lee et al. |
| 6,866,393 B2 * | 3/2005 | Yano et al. ............ 362/600 |
| 6,995,824 B2 | 2/2006 | Joten |
| 2001/0009508 A1 * | 7/2001 | Umemoto et al. ........ 362/31 |

FOREIGN PATENT DOCUMENTS

| CN | 1698002 A | 11/2005 |
| JP | 2000-147429 A | 5/2000 |
| JP | 2000-292787 A | 10/2000 |
| JP | 2002-006317 A | 1/2002 |

OTHER PUBLICATIONS

Chinese Office Action (and English translation thereof) dated Jun. 13, 2008, issued in a counterpart Chinese Application.

* cited by examiner

*Primary Examiner*—Frank G Font
*Assistant Examiner*—Michael P Mooney
(74) *Attorney, Agent, or Firm*—Frishauf, Holtz, Goodman & Chick, P.C.

(57) ABSTRACT

A liquid crystal display apparatus includes a liquid crystal display device, a surface light source for emitting illumination light toward the liquid crystal display device, and a prism sheet which is arranged between the surface light source and the liquid crystal display device. The liquid crystal display device includes an observation-side substrate and a surface-light-source-side substrate. A liquid crystal layer is interposed between the substrates. First and second electrodes are provided on at least one of inner surfaces of the substrates and apply an electric field to the liquid crystal layer. Observation-side and surface-light-source-side polarizing plates are arranged to sandwich the substrates therebetween. First and second diffusion layers having different haze values are respectively provided on opposite surface sides of the surface-light-source-side polarizing plate.

20 Claims, 1 Drawing Sheet

LIQUID CRYSTAL DISPLAY WITH IMPROVED DISPLAY UNEVENNESS

CROSS-REFERENCE TO RELATED APPLICATIONS

This application is based upon and claims the benefit of priority from prior Japanese Patent Application No. 2005-346523, filed Nov. 30, 2005, the entire contents of which are incorporated herein by reference.

BACKGROUND OF THE INVENTION

1. Field of the Invention

The present invention relates to a liquid crystal display apparatus having a prism sheet arranged between a liquid crystal display device and a surface light source.

2. Description of the Related Art

A liquid crystal display apparatus in which a surface light source which emits illumination light toward a liquid crystal display device is arranged on an opposite side of an observation side of the liquid crystal display device is known from, e.g., Jpn. Pat. Appln. KOKAI Publication No. 2000-147429. In this liquid crystal display apparatus, a prism sheet is arranged between the surface light source and the liquid crystal display device to improve luminance of display. This prism sheet has a plurality of elongated prisms formed in parallel with each other, and condenses irradiation light from the surface light source by using the elongated prisms so that the light enters the liquid crystal display device.

Such a liquid crystal display apparatus has a problem that moire fringes which correspond to a difference between a prism pitch of the prism sheet and a pixel pitch of the liquid crystal display device and are caused due to an interference of light appear in an image displayed by light emitted from the surface light source and transmitted through the prism sheet and the liquid crystal display device to exit toward the observation side, thereby deteriorating a display quality.

BRIEF SUMMARY OF THE INVENTION

It is an object of the present invention to provide a liquid crystal display apparatus which does not reduce display luminance, can prevent moire fringes from being substantially observed and display an image having an excellent quality.

According to an aspect of the present invention, there is provided a liquid crystal display apparatus comprising:

a liquid crystal display device in which a plurality of pixels are arranged in a matrix form;

a surface light source which is arranged on an opposite side of an observation side of the liquid crystal display device and emits illumination light toward the liquid crystal display device; and a prism sheet which is arranged between the surface light source and the liquid crystal display device and has a plurality of elongated prisms which are formed in parallel with each other to condense the irradiation light from the surface light source to enter the liquid crystal display device, the liquid crystal display device comprising:

an observation-side substrate and a surface-light-source-side substrate whose inner surfaces are arranged to face each other;

a liquid crystal layer interposed between the substrates;

at least one first electrode and at least one second electrode which are provided on at least one of the inner surfaces of the substrates and apply an electric field to the liquid crystal layer to form the plurality of pixels which control an alignment state of liquid crystal molecules;

an observation-side polarizing plate and a surface-light-source-side polarizing plate arranged to sandwich the substrates therebetween;

a first diffusion layer which is provided on a surface side of the surface-light-source-side polarizing plate facing the surface-light-source-side substrate and has a first haze value; and a second diffusion layer which is provided on a surface of the surface-light-source-side polarizing plate facing the surface light source and has a second haze value different from the first haze value.

In this liquid crystal display apparatus, it is preferable that the first diffusion layer is formed of a resin in which light scattering particles are mixed and the second diffusion layer is formed of a diffusion surface obtained by roughening a surface of an opposite-side polarizing plate facing a surface light source and has a haze value smaller than that of the first diffusion layer.

Further, in this liquid crystal display apparatus, it is preferable that a viewing angle compensation film arranged between the substrate on the surface light source side and the opposite-side polarizing plate is further provided, the first diffusion layer is provided between the opposite-side polarizing plate and the viewing angle compensation film adjacent thereto, and the second diffusion layer is provided on a surface of the opposite-side polarizing plate facing the surface light source. In this case, it is desirable for the first diffusion layer to be a diffusion layer having the first haze value larger the second haze value of the second diffusion layer. Furthermore, it is desirable for the second diffusion layer to be formed of a diffusion surface obtained by roughening a surface of the opposite-side polarizing plate facing the surface light source. Further, it is desirable for the first diffusion layer to consist of a resin in which light scattering particles are mixed. Moreover, it is desirable that the first diffusion layer consists of an adhesive layer in which light scattering particles are mixed and the opposite-side polarizing plate and the viewing angle compensation film adjacent thereto are attached by using the adhesive layer.

Additionally, in this liquid crystal display apparatus, it is preferable for the first haze value of the first diffusion layer to be set to fall within a range of 55 to 65. Further, it is preferable for the second haze value of the second diffusion layer to be set to fall within a range of 19 to 29. More desirably, the first haze value of the first diffusion layer is set to fall within a range of 55 to 65, and the second haze value of the second diffusion layer is set to fall within a range of 19 to 29.

The liquid crystal display apparatus according to the present invention includes the surface light source, the prism sheet and the liquid crystal display device, the first diffusion layer having the predetermined haze value is provided on the observation side of the opposite-side polarizing plate arranged on the surface light source side of the liquid crystal display device, and the second diffusion layer having a haze value different from that of the first diffusion layer is provided on a surface side of the opposite-side polarizing plate facing the surface light source. Therefore, moire fringes caused due to a difference between a prism pitch of the prism sheet 21 and a pixel pitch of the liquid crystal display device 1 are no longer observed, and an image with an excellent quality can be displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
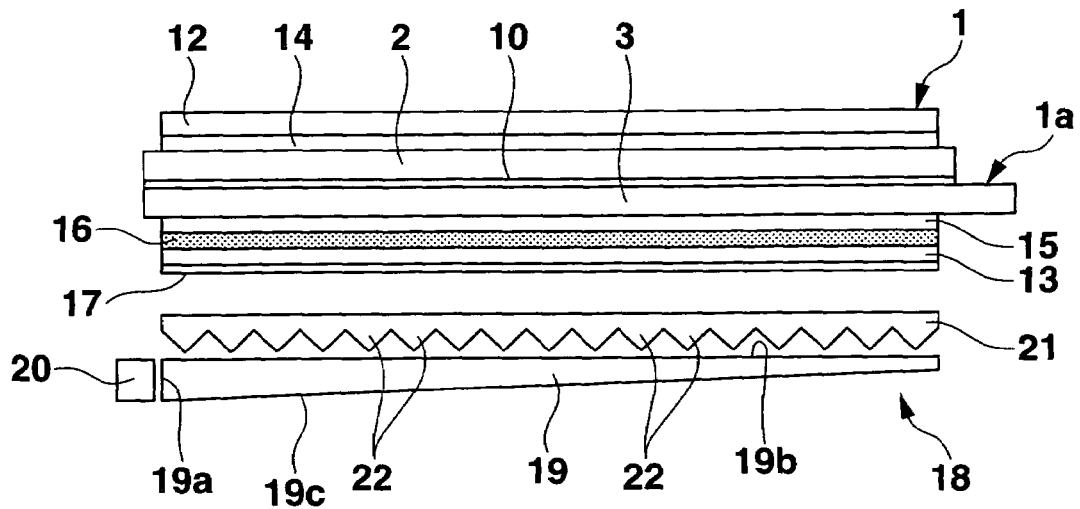
FIG. 1 is a side view of a liquid crystal display apparatus showing an embodiment of the present invention.
Figure 2:
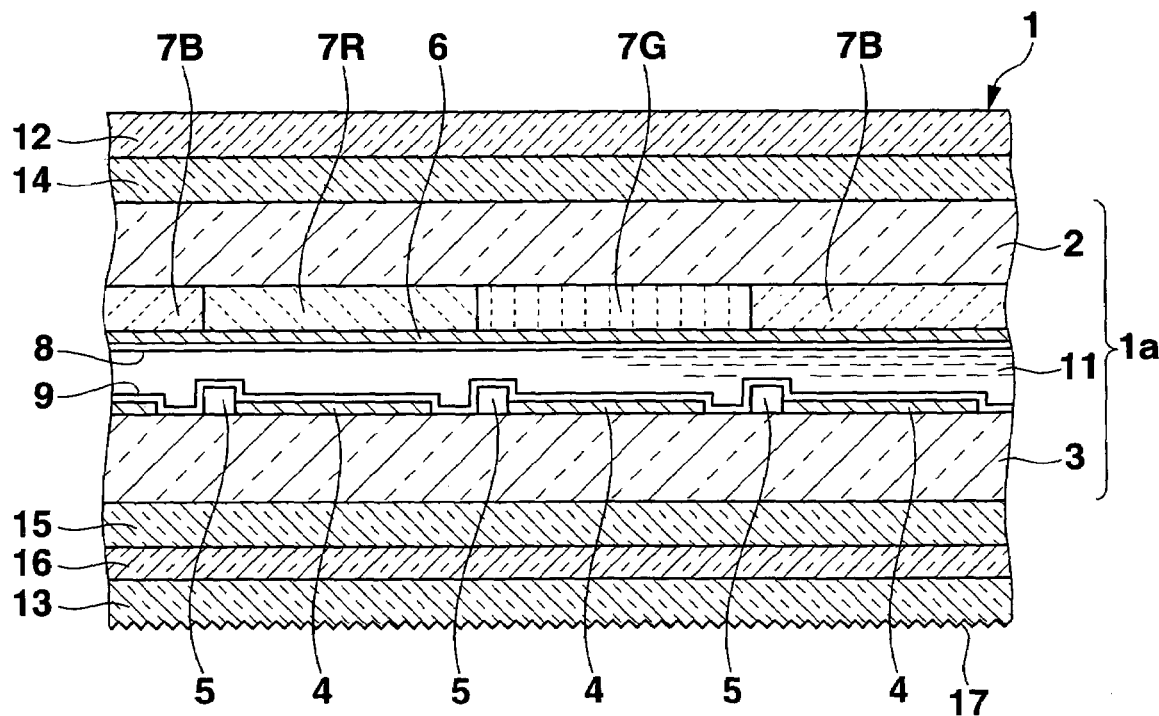
FIG. 2 is an enlarged cross-sectional view partially showing the liquid crystal display apparatus shown in FIG. 1.

FIGS. 1 and 2 show an embodiment according to the present invention, wherein FIG. 1 is a side view of a liquid crystal display apparatus whilst FIG. 2 is an enlarged cross-sectional view of a part of the liquid crystal display apparatus.

As shown in FIG. 1, this liquid crystal display apparatus has a liquid crystal display device or unit 1 in which a plurality of pixels which control transmission of light are arranged in a matrix form, and a surface light source 18 which is arranged on an opposite side of an observation side (an upper side in FIGS. 1 and 2) of the liquid crystal display device 1 and emits illumination light toward the liquid crystal display device 1. A condenser prism sheet 21 is arranged between the surface light source 18 and the liquid crystal display device 1.

The surface light source 18 is constituted of a light guide plate 19 consisting of a rectangular plate-like transparent member and a plurality of light emission elements 20 (only one element is shown in FIG. 1) such as LEDs (light-emitting diodes). The light guide plate 19 has an incidence end surface 19a from which light enters, an exit surface or front surface 19b which is formed on one of two plate surfaces and from which light which has entered from the incidence end surface 19a exits, and a reflection surface or rear surface 19c which is formed on the other plate surface and on which light which has entered from the incidence end surface 19a is reflected toward the exit surface 19b. The plurality of light emission elements 20 face the incidence end surface 19a of the light guide plate 19, are arranged along a width direction (a direction perpendicular to the drawing) and emit light toward the incidence end surface 19a.

In this embodiment, the reflection surface 19c of the light guide plate 19 is formed as an inner reflection surface on which light which has entered from the incidence end surface 19a is totally reflected at an interface between the plate surface of the light guide plate and outside air (air), but this reflection surface 19c may be formed by providing a reflection film outside the plate surface of the light guide plate.

The prism sheet 21 is obtained by forming a plurality of elongated prisms 22 on one surface or rear surface of a transparent film in parallel at close intervals along a length direction of the transparent film. This prism sheet 21 is arranged between the surface light source 18 and the liquid crystal display device 1 in such a manner that a surface on which the elongated prisms 22 are formed or rear surface thereof face the exit surface 19b of the light guide plate 19 and a length direction of the elongated prisms 22 becomes substantially parallel with a length direction (a width direction of the light guide plate 19) of the incidence end surface 19a of the light guide plate 19.

Although the elongated prisms 22 on the prism sheet 21 are exaggerated in FIG. 1, the plurality of elongated prisms are formed with a pitch which is equal to or smaller than a pixel pitch of the liquid crystal display device 1.

This prism sheet 21 uses the plurality of elongated prisms 22 to condense irradiation light emitted from the surface light source 18 (light exiting from the exit surface 19b of the light guide plate 19) in a direction along which the light exits toward the liquid crystal display device 1 so that the illumination light with high luminance enters the liquid crystal display device 1.

As shown in FIGS. 1 and 2, the liquid crystal display device 1 has a liquid crystal display panel 1a, and observation-side and opposite-side polarizing plates 12 and 13 arranged to sandwich the liquid crystal display panel 1a therebetween. Two viewing angle compensation films 14 and 15 are respectively arranged between the observation-side polarizing plate 12 on the observation side of the liquid crystal display panel and the opposite-side polarizing plate 13 on the opposite side of the observation side of the liquid crystal display panel. A first diffusion layer 16 is provided between the opposite-side polarizing plate 13 and the viewing angle compensation film 15 adjacent thereto and has a predetermined haze value (first haze value). A second diffusion layer 17 is provided on a surface of the opposite-side polarizing plate 13 facing the surface light source 18 and has a haze value (second haze value) smaller than that of the first diffusion layer 16. The liquid crystal display panel 1a has a pair of transparent substrates 2 and 3 positioned on the opposite side of the observation side, i.e., the surface light source side, and a liquid crystal layer 11 interposed between the pair of transparent substrates 2 and 3. First and second transparent electrodes 4 and 6 are provided on opposing inner surfaces of the pair of substrates 2 and 3 to face each other and apply an electric field to the liquid crystal layer 11 to form a plurality of pixels which control an alignment state of liquid crystal molecules.

The liquid crystal display panel 1a is an active matrix liquid crystal display panel having TFTs (thin film transistors) as active elements. Of the electrodes 4 and 6 respectively provided on the inner surfaces of the pair of substrates 2 and 3 of this liquid crystal display panel, the electrodes 4 provided on the inner surface of one substrate, i.e., the substrate 3 provided on the opposite side of the observation side in this embodiment constitute a plurality of pixel electrodes formed to be arranged in a matrix form along row and column directions. The electrode 6 provided on the inner surface of the other substrate, i.e., the observation-side substrate 2 constitutes a single-film-like opposed electrode formed to face the entire arrangement region of the plurality of pixel electrodes 4.

A plurality of TFTs 5 which are respectively electrically connected with the plurality of pixel electrodes 4, a plurality of gate wiring lines (not shown) which supply a gate signal to the TFT in each row, and a plurality of data wiring lines (not shown) which supply a data signal to the TFT in each column are provided on the inner surface of the surface-light-source-side substrates 3.

In FIG. 2, the TFTs 5 are schematically shown, and their specific structures are not depicted. Each TFT 5 is constituted of a gate electrode formed on the inner surface of the electrode 3, a gate insulating film consisting of a transparent insulating film formed on the substantially entire inner surface to cover the gate electrode, an i-type semiconductor film formed on the gate insulating film to face the gate electrode, and source and drain electrodes formed on opposite side portions of the i-type semiconductor film through an n-type semiconductor film.

The gate wiring lines are provided on the inner surface of the substrate 3, the data wiring lines are provided on the gate insulating film, the gate electrodes of the TFTs 5 are integrally formed with the gate wiring lines, and the drain electrodes are connected with the data wiring lines.

The plurality of pixel electrodes 4 are formed on the insulating film forming the gate insulating film, and electrically connected with the source electrodes of the TFTs 5 corresponding to the pixel electrodes 4.

The liquid crystal display panel 1a includes color filters 7R, 7G and 7B of three colors, i.e., red, green and blue provided in accordance with the plurality of pixels forming regions where the plurality of pixel electrodes 4 face the opposed electrode (a single number) 6, these color filters 7R, 7G and 7B are provided on the inner surface of the observation-side substrate 2, and the opposed electrode 6 are formed on these filters.

Alignment films 8 and 9 are respectively provided on the inner surface sides of the pair of substrates 2 and 3 to cover the opposed electrode 6 and the plurality of pixel electrodes 4.

The pair of substrates 2 and 3 are joined to each other through a frame-like sealing member 10 (see FIG. 1) surrounding the region where the plurality of pixel electrodes 4 are arranged, and a liquid crystal layer 11 is interposed in the region surrounded by the sealing member 10 between these substrates 2 and 3.

This liquid crystal display panel 1a is a liquid crystal display panel which is of a TN or STN type in which liquid crystal molecules of the liquid crystal layer 11 are twist-aligned between the pair of substrates 2 and 3, a homeotropic alignment type in which the liquid crystal molecules are substantially homeotropically aligned with respect to the substrate surfaces between the substrates 2 and 3, a homogeneous alignment type in which the liquid crystal molecules are substantially homogeneously aligned with respect to the substrate surfaces between the substrates 2 and 3 without being twisted, or a bend alignment type in which the liquid crystal molecules are bend-aligned, or a ferroelectric or antiferroelectric liquid crystal display panel. The observation-side polarizing plate 12 and the surface-light-source-side polarizing plate 13 of such a liquid crystal display panel are arranged in such a manner that directions of their transmission axes are set to perform display in a normally white or normally black mode.

The viewing angle compensation films 14 and 15 respectively arranged between the observation-side substrate 2 and the observation-side polarizing plate 12 and between the surface-light-source-side substrate 3 and the opposite-side polarizing plate 13 are optical films which sufficiently widen a viewing angle (a range of an observation angle in which display can be observed with excellent contrast) for display of the liquid crystal display device 1, and they are formed of, e.g., a discotic liquid crystal film or a biaxial retarder.

The first diffusion layer 16 provided between the opposite-side polarizing plate 13 and the viewing angle compensation film (which will be referred to as an opposite-side viewing angle compensation film hereinafter) 15 is made of an adhesive layer in which light scattering particles are mixed, and its haze value is set to 60±5 (55 to 65). The first diffusion layer 16 will be referred to as a diffusion adhesive layer hereinafter.

The second diffusion layer 17 provided on the surface of the opposite-side polarizing plate 13 facing the surface light source 18 or the rear surface of the same consists of a diffusion surface obtained by roughening the surface of the opposite-side polarizing plate 13 (this second diffusion layer 17 will be referred to as a diffusion surface hereinafter), and its haze value is set to 24±5 (19 to 29). That is, the opposite-side polarizing plate 13 is subjected to surface roughening to reduce regular reflected light from the surface facing the surface light source 18, and the diffusion surface subjected to surface roughening forms the second diffusion layer 17.

A surface of the opposite-side polarizing plate 13 on the opposite side of the diffusion surface 17 is attached to the opposite-side viewing angle compensation film 15 through the diffusion adhesive layer 16. Further, the opposite-side viewing angle compensation film 15 is attached to an outer surface of the opposite-side substrate 3 by using a non-illustrated double-sided adhesive film.

The observation-side polarizing plate 12 and the viewing angle compensation film 14 adjacent thereto (which will be referred to as an observation-side viewing angle compensation film hereinafter) are attached to each other through a non-illustrated double-sided adhesive film. The observation-side viewing angle compensation film 14 is attached to an outer surface of the observation-side substrate 2 via a non-illustrated double-sided adhesive film.

According to this liquid crystal display apparatus, since the prism sheet 21 is arranged between the surface light source 18 and the liquid crystal display device 1, irradiation light emitted from the surface light source 18 can be condensed by the plurality of elongated prisms 22 on the prism sheet 21 so that illumination light with high luminance can enter the liquid crystal display device 1, thereby increasing display luminance.

In this embodiment, the plurality of elongated prisms 22 on the prism sheet 21 are formed to condense light in a direction along which irradiation light from the surface light source 18 is emitted toward the liquid crystal display device 1, i.e., a direction along which an angle with respect to a normal line of the liquid crystal display device 1 is reduced. Therefore, it is possible to increase luminance as seen from a direction close to the normal line of the liquid crystal display device 1, i.e., front luminance.

Furthermore, this liquid crystal display apparatus includes the surface light source, the prism sheet and the liquid display device, and there are provided the liquid crystal layer 11 interposed between the pair of substrates 2 and 3 on the observation side and the opposite side, the first and second electrodes (the plurality of pixel electrodes and the single-film-like opposed electrode) 4 and 6 which are provided on the opposed inner surfaces of the pair of substrates 2 and 3 to face each other and apply an electric field to the liquid crystal layer 11 to form the plurality of pixels which control an alignment state of the liquid crystal molecules, the observation-side polarizing plate 12 and the opposite-side polarizing plate 13 which are arranged to sandwich the pair of substrates 2 and 3 therebetween, the first diffusion layer which is provided on the surface side of the opposite-side polarizing plate facing the opposite-side substrate and has a predetermined haze value, and the second diffusion layer which is provided on the surface of the opposite-side polarizing plate facing the surface light source and has a haze value different from that of the first diffusion layer. Therefore, moire fringes caused due to a difference between the prism pitch of the prism sheet 21 and the pixel pitch of the liquid crystal display device 1 are no longer observed, thereby displaying an image with an excellent quality.

Moreover, the viewing angle compensation films arranged between the surface-light-source-side substrate and the opposite-side polarizing plate are provided, the first diffusion layer is provided between the opposite-side polarizing plate and the viewing angle compensation film adjacent thereto, and the second diffusion layer is provided on the surface of the opposite-side polarizing plate facing the surface light source.

Therefore, moire fringes caused due to a difference between the prism pitch of the prism sheet 21 and the pixel pitch of the liquid crystal display device 1 are no longer observed, and hence a high-quality image with a wide viewing angle can be displayed.

That is, according to this liquid crystal display apparatus, light which has been emitted from the surface light source 18, condensed by the plurality of elongated prisms 22 on the prism sheet 21 and entered the liquid crystal display device 1 is diffused by the second diffusion layer 17 which is provided on the surface of the opposite-side polarizing plate 13 facing the surface light source 18 in the liquid crystal display device 1 and has a small haze value. This light is further diffused by the first diffusion layer 16 which is provided between the opposite-side polarizing plate 13 and the opposite-side viewing angle compensation film 15 adjacent thereto and has a large haze value close to that of the second diffusion layer 17. As a result, moire fringes due to a difference between the prism pitch of the prism sheet 21 and the pixel pitch of the liquid crystal display device 1 are not observed in an image displayed based on light transmitted through the prism sheet 21 and the liquid crystal display device 1 to exit toward the observation side.

Therefore, it is good enough for each of the first diffusion layer 16 and the second diffusion layer 17 to have a small haze value, thus suppressing a reduction in display contrast of the liquid crystal display device 1 by strong diffusion.

Additionally, in this liquid crystal display apparatus, since the first diffusion layer 16 is provided between the opposite-side polarizing plate 13 and the opposite-side viewing angle compensation film 15 adjacent thereto, a reduction in a viewing angle compensation effect obtained by the opposite-side and observation-side viewing angle compensation films 15 and 14 and a reduction in display contrast of the liquid crystal display device 1 are rarely observed like a case where light is diffused on the liquid crystal layer 11 side apart from the opposite-side viewing angle compensation film 15.

Further, according to this liquid crystal display apparatus, light which has been emitted from the surface light 18, condensed by the plurality of elongated prisms 22 on the prism sheet 21 and entered the liquid crystal display device 1 is diffused by the second diffusion layer 17 having the small haze value, and this light is further diffused by the first diffusion layer 16 having the haze value larger than that of the second diffusion layer 17. Therefore, a diffusion function provided by the two diffusion layers can prevent moire fringes caused due to a difference between the prism pitch of the prism sheet 21 and the pixel pitch of the liquid crystal display device 1 from being substantially observed in an image displayed based on light exiting from the liquid crystal display device 1.

Furthermore, in this liquid crystal display apparatus, the second diffusion layer 17 is provided on the surface of the opposite-side polarizing plate 13 facing the surface light source 18 so that irradiation light from the light source 18 can be diffused by the second diffusion layer 17 before being linearly polarized by the opposite-side polarizing plate 13. Therefore, diffusion of light by the second diffusion layer 17 rarely affects a viewing angle and contrast of the liquid crystal display device 1.

Therefore, this liquid crystal display apparatus can increase display luminance, prevent moire fringes from being observed, and display a high-quality image with high contrast.

As described above, in this liquid crystal display apparatus, it is preferable to set the haze value of the diffusion layer 16 to 60±5 and the haze value of the second diffusion layer 17 to 24±5. Setting the haze values of these diffusion layers 16 and 17 in this manner can prevent the moire fringes from being substantially observed and obtain sufficiently high contrast.

That is, when the haze value of the first diffusion layer 16 is set to, e.g., 80, since diffusion of light by this first diffusion layer 16 is large, the moire fringes are not observed, whereas display contrast of the liquid crystal display device 1 is reduced to approximately ½ as compared with a liquid crystal display apparatus which does not include the first and second diffusion layers 16 and 17.

Furthermore, when the haze value of the first diffusion layer 16 is set to, e.g., 45, although display contrast of the liquid crystal display device 1 is high, diffusion of light by the first diffusion layer 16 is small. Therefore, strong moire fringes are observed in a display image of the liquid crystal display device 1.

On the other hand, when the haze value of the first diffusion layer 16 is set to 60, contrast is not substantially reduced as compared with a liquid crystal display apparatus which does not include the first and second diffusion layers 16 and 17, thus obtaining sufficiently high contrast whose contrast value is 280 to 290.

Moreover, when the haze value of the first diffusion layer 16 is set to 60 and the haze value of the second diffusion layer 17 is set to 24, the moire fringes are not substantially observed, and display contrast of the liquid crystal display device 1 is sufficiently high.

It is good enough for the haze value of the first diffusion layer 16 to fall within a range of 60±5 and the haze value of the second diffusion layer 17 to fall within a range of 24±5, and setting the haze values of these diffusion layers 16 and 17 to fall within the above-described ranges can prevent the moire fringes from being substantially observed and sufficiently increase the contrast.

Additionally, according to this liquid crystal display apparatus, since the second diffusion layer 17 is determined as the diffusion surface obtained by roughening the surface of the opposite-side polarizing plate 13 facing the surface light source 18, the structure of the liquid crystal display apparatus can be simplified and manufacture of this apparatus can be facilitated as compared with a case where an additional diffusion film is arranged as the second diffusion layer on the surface of the opposite-side polarizing plate 13 facing the surface light source 18.

Further, in this liquid crystal display apparatus, the first diffusion layer 16 is formed of the diffusion adhesive layer consisting of the adhesive layer in which light scattering particles are mixed, and the opposite-side polarizing plate 13 and the opposite-side viewing angle compensation film 15 adjacent thereto are attached to each other via the diffusion adhesive layer 16. Therefore, manufacture of the liquid crystal display apparatus can be further facilitated.

In the foregoing embodiment, the liquid crystal display device 1 has the structure in which the first and second electrodes (the plurality of pixel electrodes and the single-film-like opposed electrode) 4 and 6 which apply a vertical electric field along a layer thickness direction to the liquid crystal layer 11 to form the plurality of pixel regions which control an alignment state of the liquid crystal molecules are respectively provided on the inner surfaces of the pair of substrates 2 and 3 to face each other. However, the liquid crystal display device 1 may be of a transverse electric field control type in which first and second electrodes (e.g., a comb-like signal electrode having a plurality of comb teeth and a common electrode which generates a transverse electric field between the respective comb teeth of the signal electrode) which apply a transverse electric field along the surface of the substrate 3 to the liquid crystal layer 11 to form a plurality of pixel regions which control an alignment state of the liquid crystal molecules are provided on the inner surface of one of the pair of substrates 2 and 3, e.g., the opposite-side substrate 3 to be insulated from each other.

Furthermore, the liquid crystal display device 1 may perform both transmission display which utilizes illumination light from the surface light source 18 and reflection display which utilizes external light (light in a use environment of the liquid crystal display apparatus) entering from the observation side. In such a case, a transflective/reflective plate may be arranged between the opposite-side substrate 3 and the opposite-side viewing angle compensation film 15, or a reflection film may be provided on the inner surface of the opposite-side substrate 3 to face a predetermined region of the plurality of pixels, and a part of the plurality of pixels corresponding to the reflection film may form a reflection displaying portion whilst a part of the plurality of pixels where the reflection film is not provided may form a transmission display portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   a liquid crystal display panel in which a plurality of pixels are arranged in a matrix form;
   a surface light source which irradiates the liquid crystal display panel with light through a prism sheet that has a plurality of elongated prisms formed in parallel with each other;
   a polarizing plate arranged between the liquid crystal display panel and the prism sheet;
   a first diffusion layer which is provided between the liquid crystal display panel and the polarizing plate, and which has a first haze value; and
   a second diffusion layer which is provided between the polarizing plate and the prism sheet, and which has a second haze value smaller than the first haze value.

2. The liquid crystal display apparatus according to claim 1, wherein the first diffusion layer includes a resin in which light scattering particles are mixed, and
   the second diffusion layer includes a diffusion surface obtained by roughening a surface of the polarizing plate facing the prism sheet.

3. A liquid crystal display apparatus comprising:
   a liquid crystal display panel in which a plurality of pixels are arranged in a matrix form;
   a surface light source which irradiates the liquid crystal display panel with light through a prism sheet that has a plurality of elongated prisms formed in parallel with each other;
   a polarizing plate arranged between the liquid crystal display panel and the prism sheet;
   a first diffusion layer which is provided between the liquid crystal display panel and the polarizing plate, and which has a first haze value;
   a second diffusion layer which is provided between the polarizing plate and the prism sheet, and which has a second haze value different from the first haze value; and
   a viewing angle compensation film arranged between the liquid crystal display panel and the polarizing plate.

4. The liquid crystal display apparatus according to claim 3, wherein the first haze value is larger than the second haze value.

5. The liquid crystal display apparatus according to claim 3, wherein the second diffusion layer includes a diffusion surface obtained by roughening a surface of the polarizing plate facing the prism sheet.

6. The liquid crystal display apparatus according to claim 3, wherein the first diffusion layer includes a resin in which light scattering particles are mixed.

7. The liquid crystal display apparatus according to claim 3, wherein the first diffusion layer includes an adhesive layer in which light scattering particles are mixed, and the polarizing plate and the viewing angle compensation film are attached through the adhesive layer.

8. The liquid crystal display apparatus according to claim 3, wherein the first haze value is set to fall within a range of 55 to 65.

9. The liquid crystal display apparatus according to claim 3, wherein the second haze value is set to fall within a range of 19 to 29.

10. The liquid crystal display apparatus according to claim 3, wherein the first haze value is set to fall within a range of 55 to 65, and the second haze value is set to fall within a range of 19 to 29.

11. The liquid crystal display apparatus according to claim 1, wherein the surface light source includes a light guide plate and a plurality of light emission elements, wherein the light guide plate is arranged to face the prism sheet.

12. The liquid crystal display apparatus according to claim 11, wherein said plurality of light emission elements are arranged to face a side surface of the light guide plate.

13. The liquid crystal display apparatus according to claim 1, wherein said plurality of elongated prisms are arranged with a pitch which is equal to or smaller than a pixel pitch of said plurality of pixels.

14. The liquid crystal display apparatus according to claim 1, wherein the liquid crystal display panel comprises a first substrate including a thin film transistor in each of the pixels, and a second substrate disposed to face the first substrate.

15. The liquid crystal display apparatus according to claim 14, wherein the second substrate includes a color filter in each of the pixels.

16. The liquid crystal display apparatus according to claim 14, further comprising another polarizing plate provided on a side of the second substrate.

17. The liquid crystal display apparatus according to claim 3, wherein the liquid crystal display panel comprises: (i) a first substrate including a thin film transistor in each of the pixels, and (ii) a second substrate disposed to face the first substrate, wherein the prism sheet is arranged on a side of the first substrate.

18. The liquid crystal display apparatus according to claim 17, further comprising another polarizing plate provided on a side of the second substrate, and another viewing angle compensation film arranged between the liquid crystal display panel and said another polarizing plate.

19. The liquid crystal display apparatus according to claim 3, wherein the surface light source includes a light guide plate and a plurality of light emission elements, wherein light guide plate is arranged to face the prism sheet.

20. A liquid crystal display apparatus comprising:

a liquid crystal display panel in which a plurality of pixels are arranged in a matrix form;

a surface light source which irradiates the liquid crystal display panel with light through a prism sheet that has a plurality of elongated prisms formed in parallel with each other;

a polarizing plate arranged between the liquid crystal display panel and the prism sheet;

a first diffusion layer, which: (i) is provided between the liquid crystal display panel and the polarizing plate, (ii) has a predetermined first haze value, and (iii) includes a resin in which light scattering particles are mixed; and a second diffusion layer, which: (i) is provided between the polarizing plate and the prism sheet, (ii) has a predetermined second haze value different from the first haze value, and (iii) includes a diffusion surface obtained by roughening a surface of the polarizing plate facing the prism sheet.

* * * * *